United States Patent [19]

Connolly et al.

[11] Patent Number: 5,016,171

[45] Date of Patent: May 14, 1991

[54] COPY CARTRIDGE WARRANTY AND BILLING SYSTEM

[75] Inventors: Douglas P. Connolly, Webster; Barry G. Rickett, Pittsford; Robert J. Yax, Springwater; Roger M. Swanson, Fairport, all of N.Y.

[73] Assignee: Xerox Corporation, Stamford, Conn.

[21] Appl. No.: 341,003

[22] Filed: Apr. 20, 1989

[51] Int. Cl.⁵ .................. G06F 7/00; G03G 15/00
[52] U.S. Cl. ........................... 364/406; 355/201
[58] Field of Search ............ 355/201, 202, 308, 133; 364/406

[56] References Cited

U.S. PATENT DOCUMENTS

| | | | |
|---|---|---|---|
| 3,997,873 | 12/1976 | Thorton | 355/201 |
| 4,500,195 | 2/1985 | Hosono | 355/3 R |
| 4,501,485 | 2/1985 | Tsudaka | 355/201 |
| 4,531,826 | 7/1985 | Stoughton et al. | 355/20 |
| 4,551,000 | 11/1985 | Kanemitsu et al. | 355/3 R |
| 4,585,327 | 4/1986 | Suzuki | 355/3 R |
| 4,634,258 | 1/1987 | Tanaka et al. | 355/4 |
| 4,751,484 | 6/1988 | Matsumoto et al. | 355/14 CU |
| 4,774,544 | 9/1988 | Tsuchiya et al. | 355/14 C |

FOREIGN PATENT DOCUMENTS 0263164 12/1985 Japan .

Primary Examiner—Michael R. Fleming
Assistant Examiner—Gail O. Hayes
Attorney, Agent, or Firm—Frederick E. McMullen

[57] ABSTRACT

Customer billing system for electrostatographic reproducing machines in which a replaceable copy cartridge provides a guaranteed number of copies or prints, each cartridge having an integral copy counter which, on reaching a predetermined copy count, is disabled, rendering the cartridge dead and activating an additional copy counting mechanism for counting a limited number of grace copies that can be made using the dead cartridge, after which further operation of the machine is prevented until a new cartridge is installed.

15 Claims, 8 Drawing Sheets

COPY CARTRIDGE WARRANTY AND BILLING SYSTEM

BACKGROUND OF THE INVENTION

The present invention relates to electrostatographic reproducing machines, and more particularly to a customer billing system based on the use of replaceable copy cartridges.

Recently, electrostatographic reproducing machines have been developed which use one or more replaceable subassemblies, termed cartridges. One typical cartridge is the so-called copy cartridge containing the machine photoreceptor and the necessary supporting hardware therefor assembled in a single unit designed for insertion and removal into and out of the machine. When the copy cartridge is used up, the old cartridge is removed and a new one substituted. Other replaceable cartridges include developer cartridges, toner supply cartridges, etc.

PRIOR ART

In the prior art, U.S. Pat. No. 4,634,258 (Tanaka et al) discloses a color copier employing replaceable color toner developer containers. Counters in the machine, which record and display to the operator the number of copies made with each color toner developer container, allow the operator to keep track of the amount of color developer used for each container. In a similar vein, U.S. Pat. No. 4,551,000 (Kanemitsu et al) discloses a replaceable processing unit for copier having an external colored indicator to display the amount of service life remaining in the processing unit.

In addition, U.S. Pat. No. 4,585,327 (Suzuki) discloses a copier employing a removable magazine containing the machine photosensitive belt. A counter in the machine counts the number of copies made on the magazine and generates a signal on a preset count that warns the user that the service life of the photosensitive belt has come to an end. To prevent reuse of the same magazine, a part of the magazine is broken off when the magazine is first loaded into the machine that precludes resetting of the counter in the event a used magazine is inadvertently inserted.

Further, U.S. Pat. No. 4,751,484 (Matsumoto et al) discloses an image forming apparatus which records drum usage and stops the drum and renders the apparatus inoperable following making of a preset number of copies, while U.S. Pat. No. 4,500,195 (Hosono) discloses an image forming apparatus employing a replaceable copy subassembly. When a new unit is installed, the operating parameters of the apparatus are automatically re-adjusted in accordance with the built-in operating characteristics of the new unit. And U.S. Pat. No. 4,774,544 (Tsuchiya et al) discloses a counter for an image forming apparatus in which the counter comprises an EEPROM.

SUMMARY OF THE INVENTION

In contrast, the present invention is concerned with a customer billing system in which the customer is billed for copy cartridges used, each cartridge being warranted to provide a certain number of copies or prints when attached to the machine. When a cartridge is exhausted, the customer removes the old cartridge and substitutes a fresh one. Should a cartridge fail prematurely, a new cartridge is provided free of charge.

More specifically, the invention provides customer billing system for an electrostatographic copying or printing machine, the machine having an operating system for controlling operation of the machine, comprising, in combination: a replaceable cartridge for use in operating the machine, the cartridge having a limited operational life allowing the machine on installation of the cartridge to produce a preset number of copies; the cartridge including a copy counter; counter operating means on the machine for indexing the cartridge copy counter as copies are produced by the machine; and counter disabling means to disable the cartridge copy counter when the cartridge copy counter reaches a predetermined count representative of the preset number of copies.

The invention further provides a billing/warranty method for copier/printing machines employing a replaceable subassembly, comprising the steps of: warranting a preset number of copies with the subassembly; as the copies are produced, tolling a copy count on the subassembly; and when the copy count reaches a predetermined maximum copy count reflecting the preset number of copies, precluding further operation of the machine until a new subassembly is installed.

BRIEF DESCRIPTION OF THE DRAWINGS

Other features of the present invention will become apparent as the following description proceeds and upon reference to the drawings in which.

DESCRIPTION OF THE PREFERRED EMBODIMENT

The invention will now be described with reference to a preferred embodiment of the customer billing system of the present invention using a Customer Replaceable Unit (CRU) in the form of a copy cartridge 12. Although the billing system of the present invention is particularly well adapted for use in automatic electrostatographic reproducing machines, it should become evident from the following description that it is equally well suited for use in a wide variety of processing systems including other electrostatographic systems and is not necessarily limited in application to the particular embodiment or embodiment shown herein.

Figure 1:
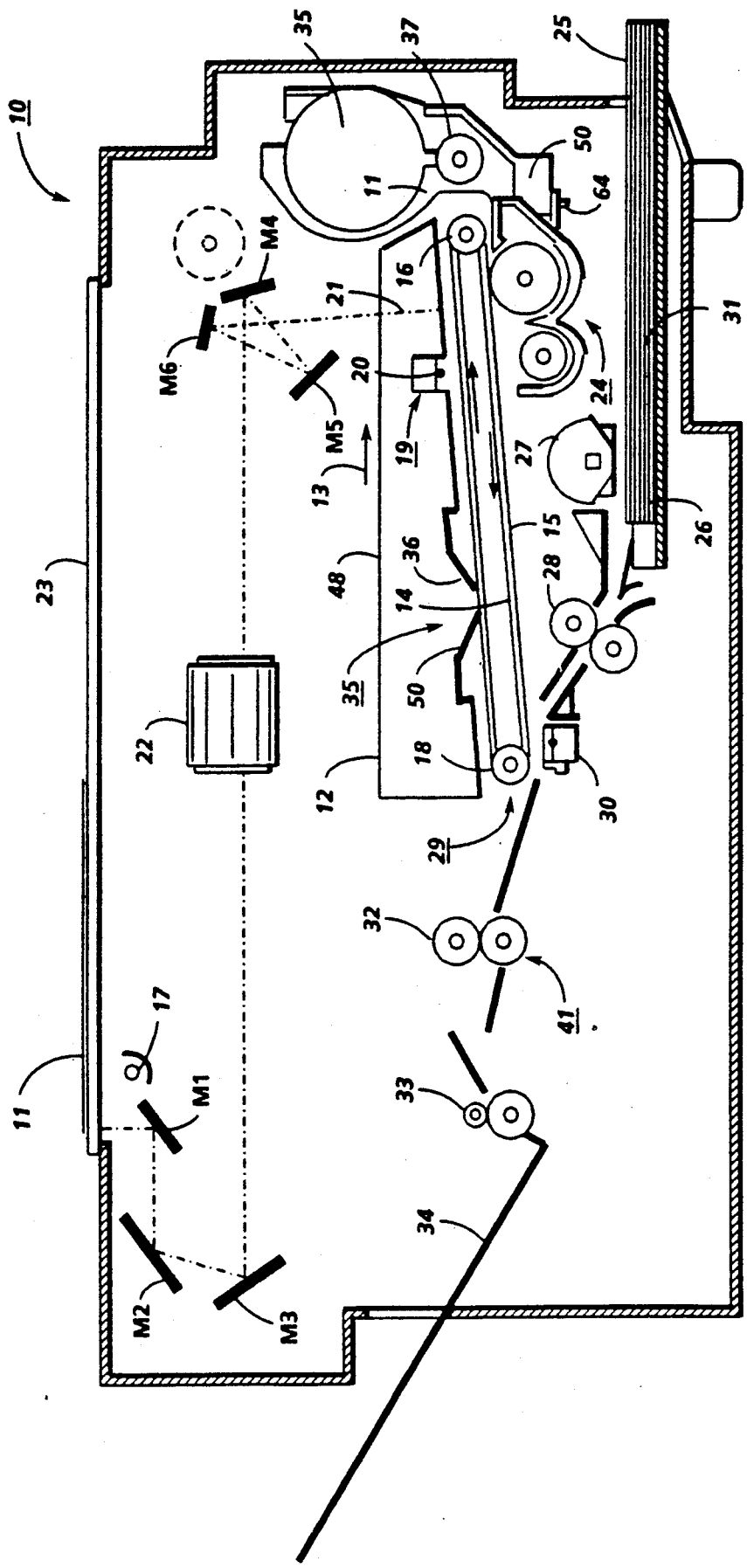
FIG. 1 is a schematic representation in cross section of an automatic electrostatographic reproducing machine having a replaceable copy cartridge warranted to provide a preset number of copies in accordance with the teachings of the present invention.

Referring now to FIG. 1, there is shown by way of example an automatic electrostatographic reproducing machine 10 of the type adapted to implement the customer billing system of the present invention. In the example shown, reproducing machine 10 comprises a copier employing a replaceable copy cartridge 12 which provides the machine owner or user a preset number of copies or prints.

In the ensuing description, as will appear more fully, each cartridge 12 is warranted to produce a preset number of copies (N). When the last copy is made, cartridge 12 is said to be 'dead'. In order to provide time for the customer to obtain and replace a 'dead' cartridge with a new or 'live' cartridge, a grace period during which a limited number of additional copies (N') can be made using the 'dead' cartridge is provided. Following making of the last one of the grace copies, further operation of machine 10 is prevented. At that point, the 'dead' cartridge 12 must be withdrawn by the customer and replaced by a new or 'live' cartridge for further operation of machine 10.

Copy cartridge 12 includes a belt-like photoreceptor 14, the outer periphery of which is coated with a suitable photoconductive material 15. Photoreceptor 14 is suitably mounted for revolution within the cartridge about a driven transport roll 16 and idler roll 18, photoreceptor 14 traveling in the direction indicated by the arrows to bring the image bearing surface thereon past the plurality of xerographic processing stations on proper installation of cartridge 12 in the machine. Suitable drive means such as a motor (not shown) is coupled to roll 16 on installation of cartridge 12 to drive the component parts of copy cartridge 12 in synchronism with the various operating components of machine 10 to produce copies of original documents 11 upon a suitable support material, such as copy sheet 31 or the like.

In the xerographic process practiced, photoreceptor 14 is initially uniformly charged by charge corotron 20 as photoreceptor 14 moves through a charging station 19. Thereafter, the charged photoconductive surface 15 is exposed to the light image of document 11 at exposure station 21 to create an electrostatic latent image of the document on photoreceptor 14.

A scanning optical system with lamp 17 and mirrors $M_1$, $M_2$, $M_3$ mounted on a scanning carriage (not shown) scans the documents 11 resting on a transparent platen 23. The resulting light image is conducted by lens 22 and mirrors $M_4$, $M_5$, $M_6$ to the photoconductive surface 15 of photoreceptor 14. The operating speed of the scanning system and the speed of photoreceptor 14 are synchronized with one another to provide faithful reproduction of the original document without blur or distortion.

After exposure, the electrostatic latent image on the photoconductive surface 15 of photoreceptor 14 is transported to development station 24 where the image is developed by a developer unit or subassembly 11. Developer unit 11 utilizes a magnetic brush development system and a magnetizable developer mix having coarse magnetic carrier granules and toner colorant particles.

A supply of copy sheets 31 is provided in a stack 25 arranged on a support tray 26. A segmented feed roll 27 feeds individual sheets from the stack on tray 26 to a registration pinch roll pair 28. Following registration, the sheets are forwarded to a transfer station 29 in proper timed relation with the developed image on photoreceptor 14. There, the developed image is transferred to the copy sheet 31 by means of transfer corotron 30. Following transfer, the copy sheet bearing the toner image is separated from photoreceptor 14 and advanced to fixing station 41 wherein roll fuser 32 fixes the transferred powder image thereto. After fusing the toner image to the copy sheet the sheet 31 is advanced by output rolls 33 to sheet stacking tray 34.

Any residual toner particles remaining on photoreceptor 14 after transfer are removed at cleaning station 35 by a cleaning blade in scrapping contact with the surface of photoreceptor 14.

Figure 2A:
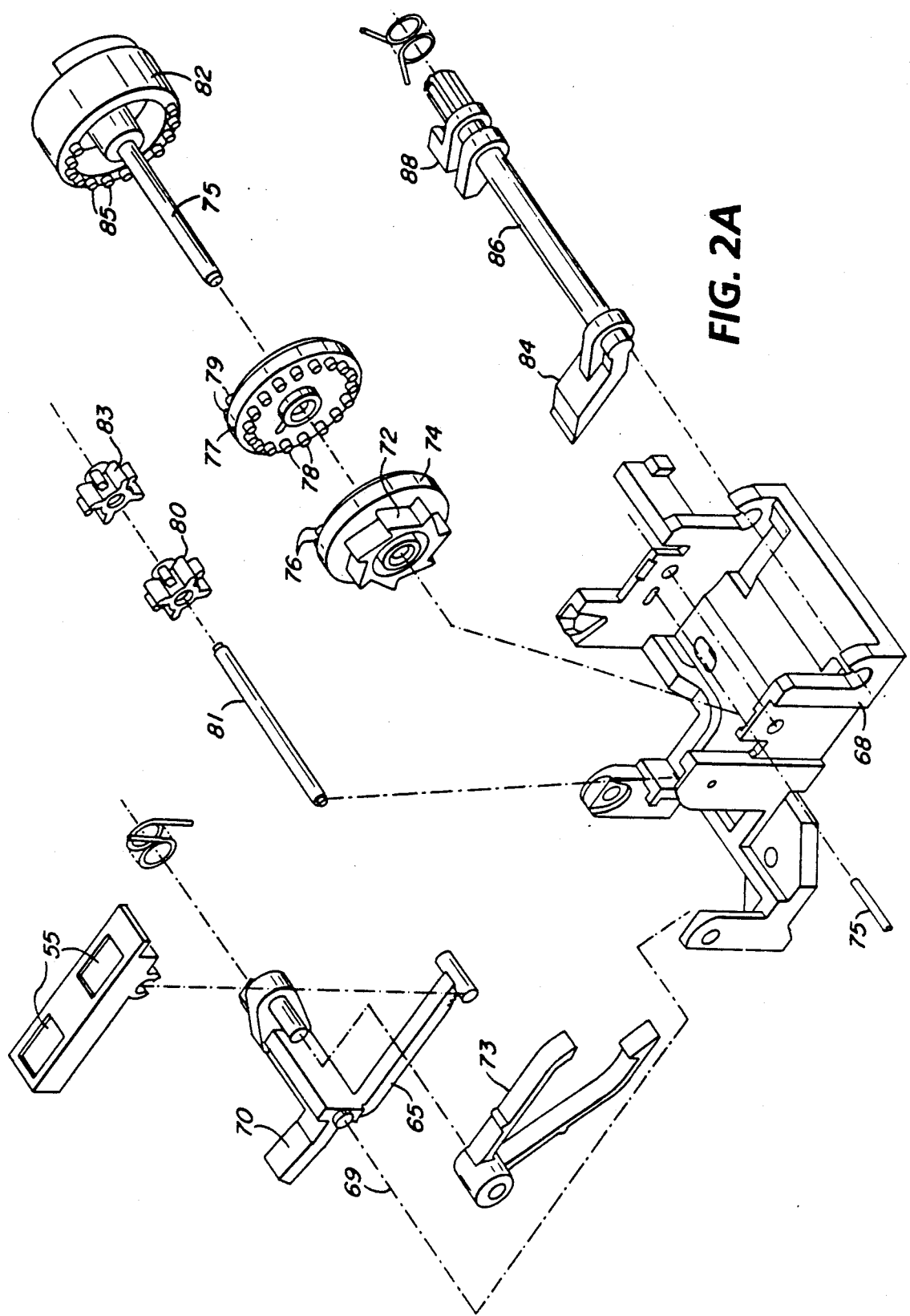
FIGS. 2A and 2B are isometric views showing details of the cartridge on-board copy counter and the interrelationship with the counter indexing solenoid in the machine.
Figure 2B:
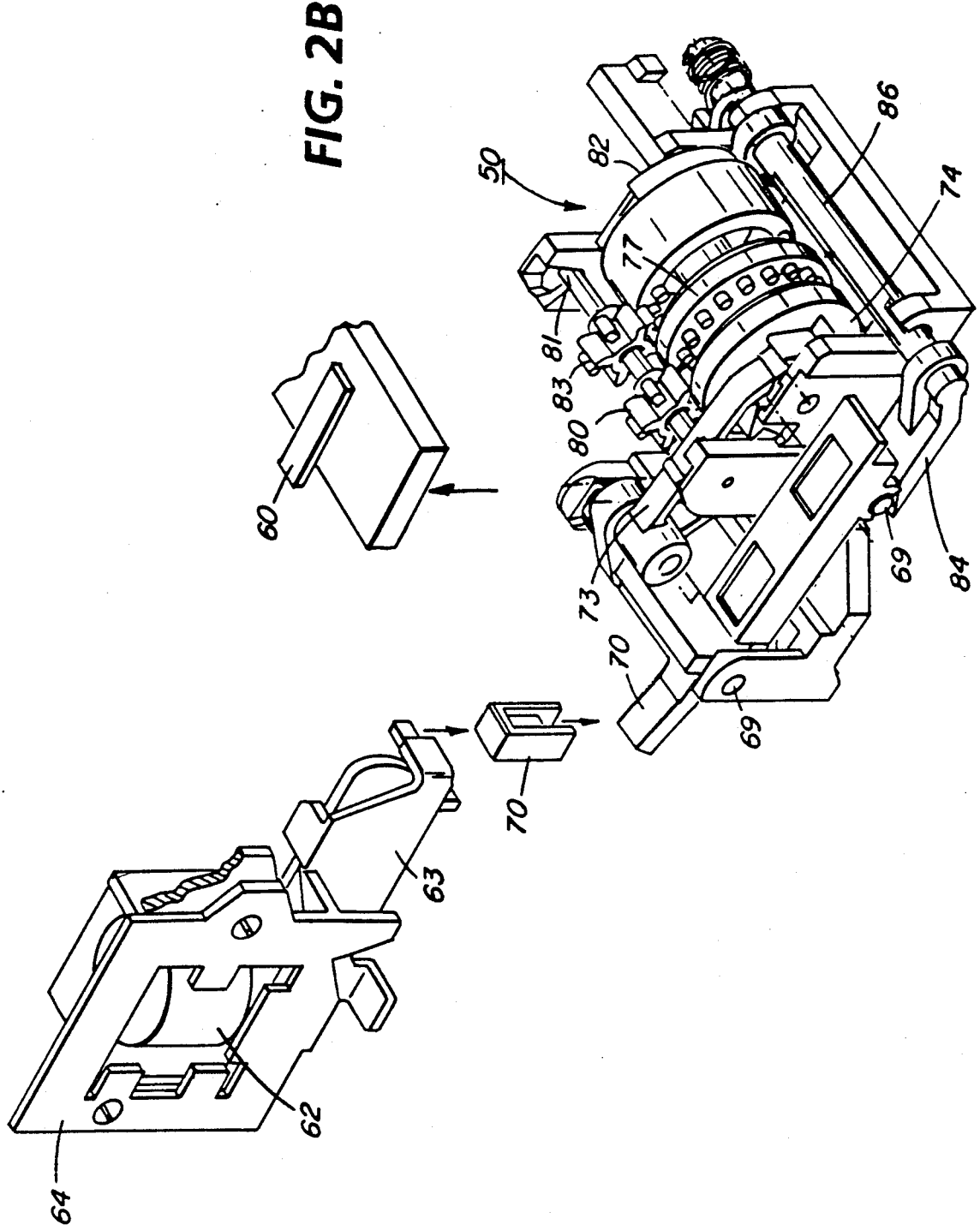
Figure 3:
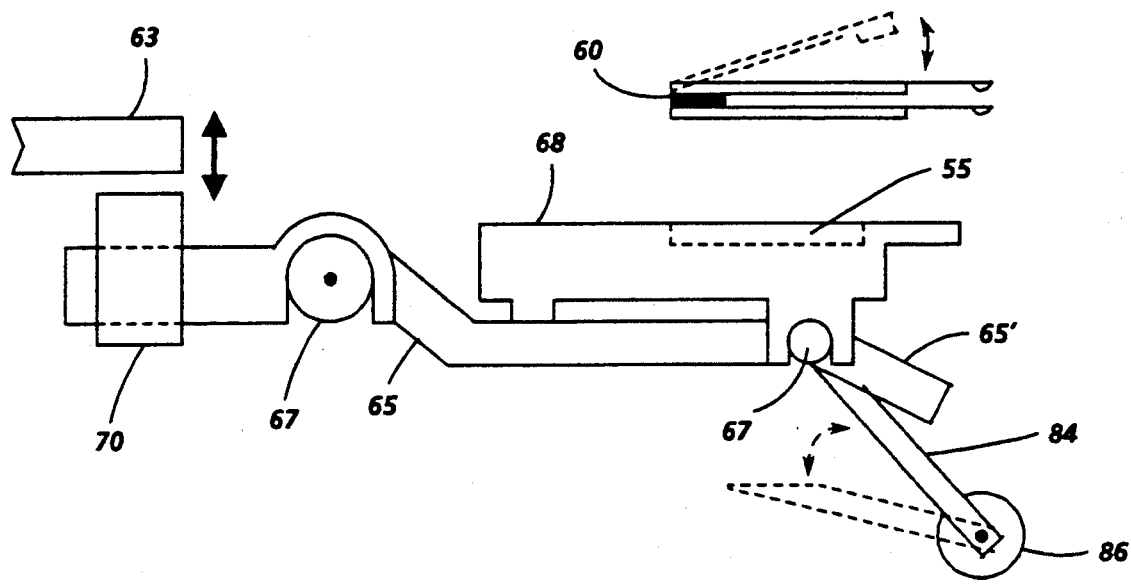
FIG. 3 is a side view showing the cartridge copy counter in the locked position following making of the preset number of copies warranted.

Referring to FIGS. 2 and 3, each copy cartridge 12 includes a mechanical cartridge counter 50 with a movable magnet 55 which cooperates with a reed switch 60 to form an end of life indicator for cartridge 12 as will appear. Reed switch 60 is positioned to sense the position of magnet 55. A solenoid 62 has a actuating arm 63 which serves when energized to increment counter 50. Reed switch 60 and solenoid 62 are supported on the adjoining optical housing 64 of machine 10 such that on installation of the copy cartridge 12 in machine 10, reed switch 60 and arm 63 of solenoid 62 are brought into operative relation with magnet 55. Preferably counter 50 is integral with the copy cartridge 12 so that any attempt to tamper with counter 50 will damage or destroy copy cartridge 12.

Counter 50 has a pivotable drive link 65, with magnet 55 at one end, link 55 being supported in a counter housing 68 by shaft 69. The projecting end of link 65 provides a drive button 70 for engagement with the actuating arm 63 of solenoid 62, energization of solenoid 62 driving button 70 downwardly to pivot link 65 in a counterclockwise direction to raise magnet 55 upwardly.

A drive pawl 73 is pivotally mounted on link 65 so as to drivingly engage a ratchet wheel 74 rotatably supported on a shaft 75. Pawl 73 engages with the teeth 72 of ratchet wheel 74 so that each time pawl 73 is pivoted as a result of energization of solenoid 62 and movement of drive link 65, wheel 74 is indexed one notch. Interengagement of pawl 73 with teeth 72 on ratchet wheel 74 prevents rotation of wheel 74 in the opposite direction.

Ratchet wheel 74 includes a pair of pins 76 engageable with the teeth of intermediate pinion gear 80 on adjoining shaft 81, pins 76 and gear 80 cooperating to index a second wheel 77 disposed on shaft 75 once each time wheel 74 makes one complete revolution. The inner circumference of wheel 77 has a series of teeth in the form of pins 78 engageable with the teeth of gear 80 for this purpose. Wheel 77 in turn indexes, through a pair of pins 79 and intermediate pinion gear 83, an adjoining cam 82 on shaft 75. The inner circumference of cam 82 has a series of teeth in the form of pins 85 engageable with the teeth of gear 83 for this purpose. The relative number of pins and gear teeth are such that cam 82 is rotated by a predetermined small degree for each revolution of wheel 77.

To indicate when the count on counter 50 has reached a predetermined maximum, a lockout arm 84 is provided to prevent magnet 55 from dropping down and out of contact with reed switch 60 at that point. Lockout arm 84 is supported at one end of a rotatable shaft 86 in opposed relation to drive link 65. A cam follower 88 on the opposite end of shaft 86 rides on cam 82. On cam 82 turning through a predetermined angle of rotation, cam follower 88 rotates shaft 86 to raise lockout arm 84 to the position shown in FIG. 3, preventing magnet 55 from returning to the lowered position following deenergization of solenoid 62.

As will appear, cartridge counter 50 is essentially a running log of the copy volume on copy cartridge 12. Energization of solenoid 62 pivots drive link 65 to increment ratchet wheel 74 and index counter 50 by one count. At the same time, magnet 55 is raised to the position shown by dotted lines in FIG. 4. On subsequent deenergization of solenoid 62, magnet 55 is lowered to the position shown by solid lines in FIG. 4. Reed switch 60 detects movement of magnet 55 to and from the raised position, switch 60 closing as magnet 55 is raised into position adjacent thereto and thereafter opening as magnet 55 is lowered After counter 50 has been indexed a predetermined number of times Y corresponding to the maximum number N of warranty copies, magnet 55 is prevented from returning to the lowered position by lockout arm 84 as shown in FIG. 3. The signal from reed switch 60 accordingly remains high, signaling that the maximum number of allowable warranty copies N has been reached. At this point, the cartridge 12 is dead and a display 13 on the copier console is turned on to inform the user or operator that a fresh copy cartridge 12 should be ordered to replace the cartridge currently in the machine.

In order to allow the operator time to obtain and install a fresh copy cartridge 12, a grace period during which a preset number of extra grace copies (N') can be made is provided. Grace copies as used herein refers to those copies which are allowed while the operator obtains and installs a fresh copy cartridge. This precludes sudden shutdown of the machine when all of the warranted copies are used up.

Figure 4:
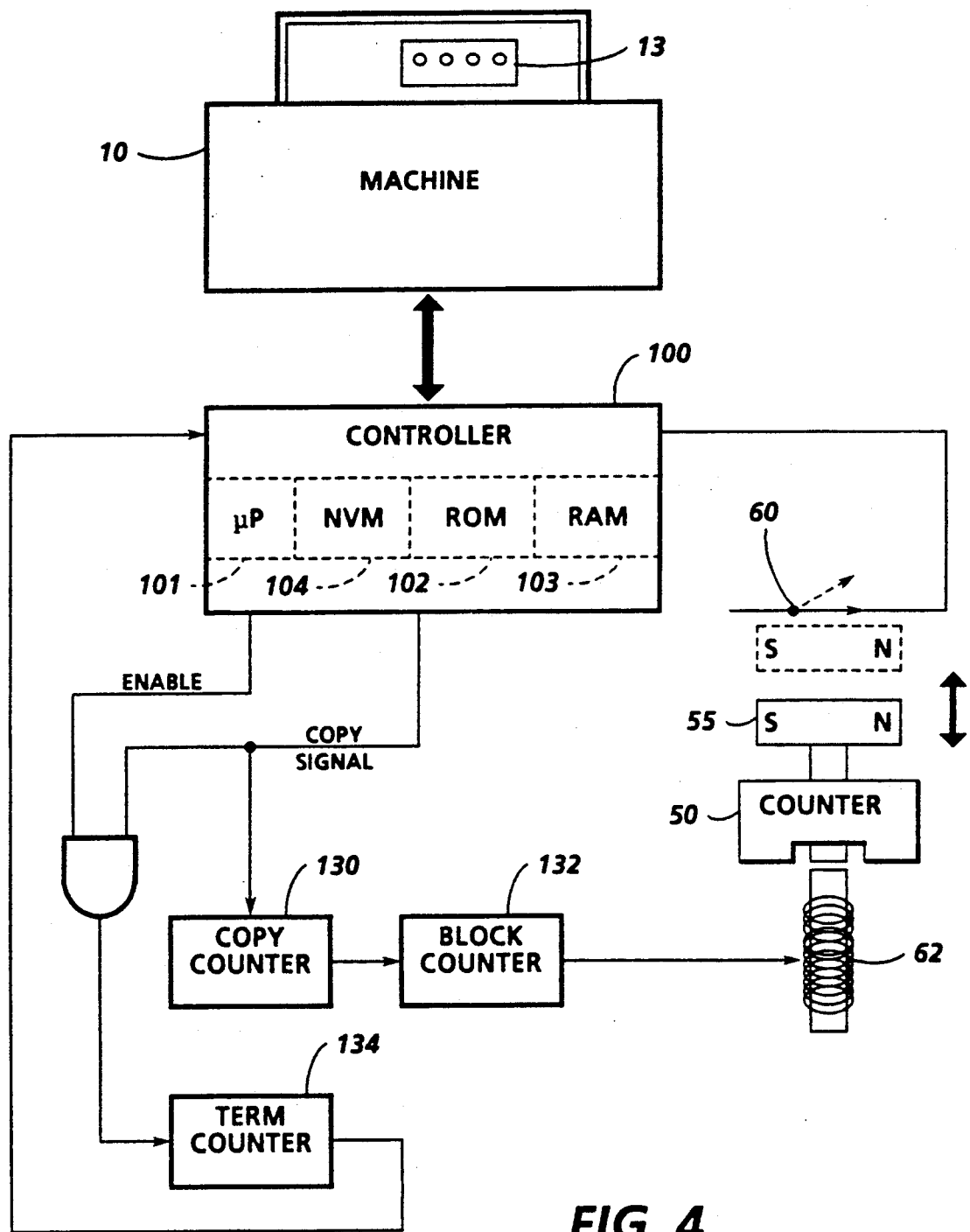
FIG. 4 is a control schematic depicting the principal elements of the copy counting and cartridge lockout system for counting copies and preventing use of expired cartridges.

Referring now to FIG. 4, a suitable controller 100 which includes one or more microprocessors 101 and suitable memory, such as ROM, RAM, and NVM memories 102, 103, 104 respectively for holding the machine operating system software, programming data, etc., is provided for operating the various component parts of machine 10 in an integrated fashion to produce copies.

A copy counter 130 (EOL), a block counter 132 (SOL), and a term counter 134 (TERM) are provided in the machine software. Copy counter 130 counts the number of warranty copies made up to a preset number X, following which counter 130 is reset back to zero (0). Block counter 132 is indexed by one each time counter 130 is reset. At the end of the copy run in which counter 132 is indexed, solenoid 62 is energized for a brief period to index cartridge counter 50 by one up to a predetermined block count Y representing the maximum allowable warranty copies N [i.e., (X) (Y)=N] permitted. With each index of cartridge counter 50, block counter 132 is decremented by one.

Term counter 134 serves to count the number of grace copies made during the grace period up to a maximum of N' at which point machine 10 is disabled and no further copies are permitted until a new cartridge is installed as will appear. Term counter 134 is a block counter working in unison with copy counter 130 and functioning in the same manner as cartridge counter 50. The signal from term counter 134 on reaching a predetermined count of Y' indicating that the maximum number of grace copies N' [i.e., (X) (Y')=N'] has been reached, shuts down machine 10.

OPERATION

Figure 5:
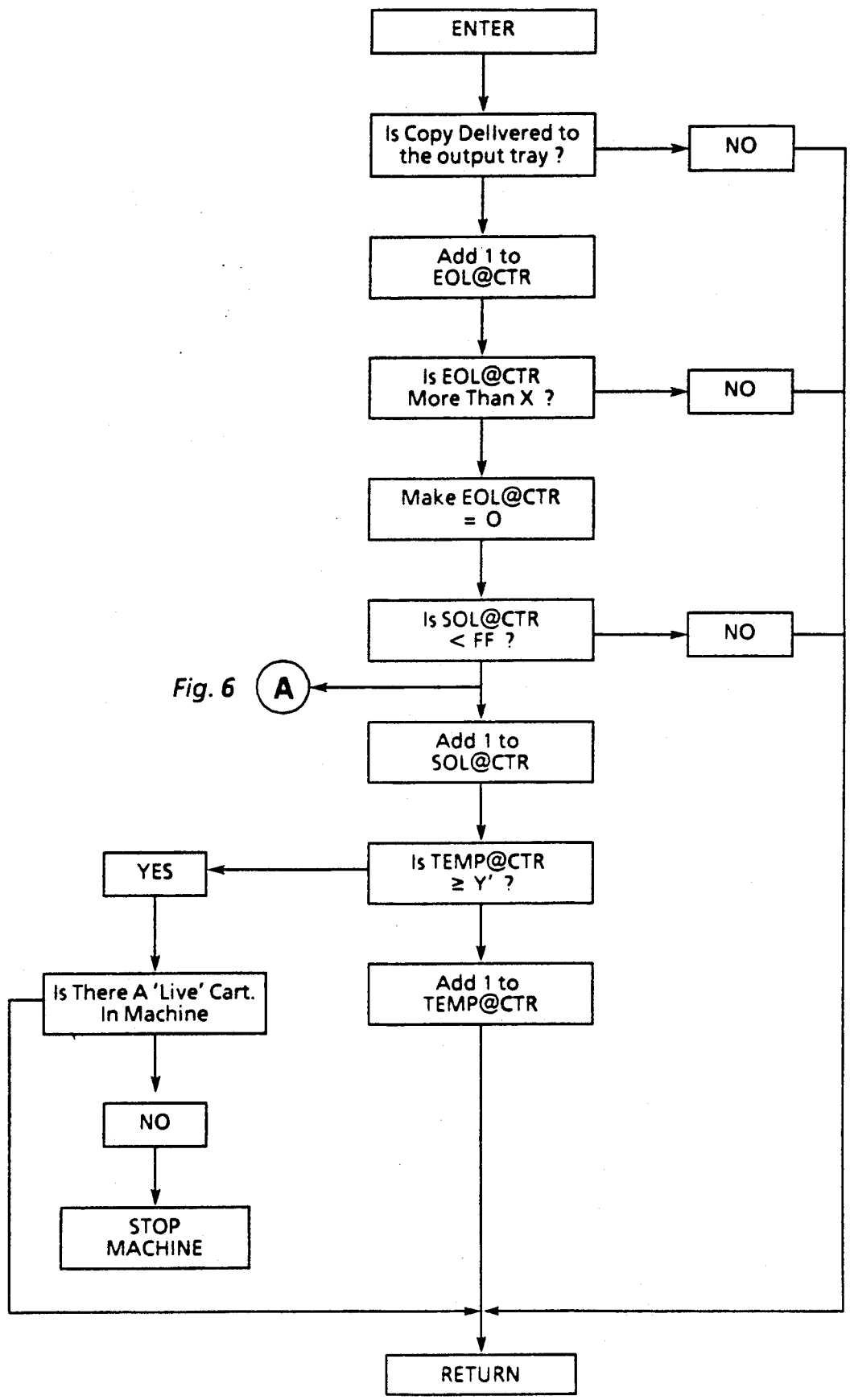
FIG. 5 is a flow chart depicting the copy counting cycle.
Figure 6:
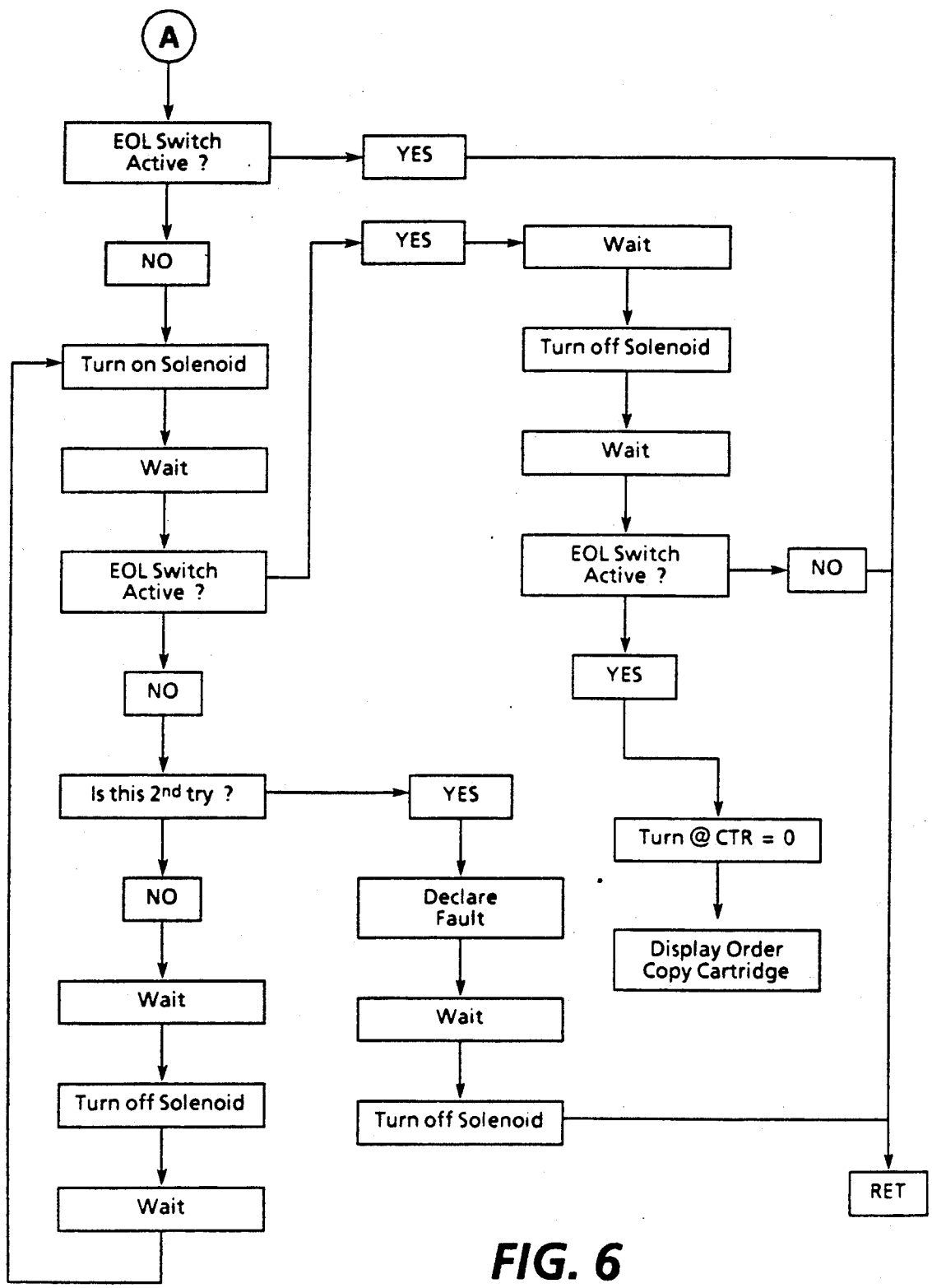
FIG. 6 is a flow chart depicting the operating cycle for indexing the on-board cartridge copy counter.

Referring to the software routines "CRU-EOL-COUNTER", "HDWR-CTR-INCREMENT", "EOL-TICKLE-CHECK", TBL-FAULT-TICKLE", "CRU-SOL-OFF", and "KILL-CRU" (Copyright 1987, 1988, Xerox Corp., All Rights Reserved) of Appendix A and particularly to FIGS. 5 and 6, during copying, copy counter 130 (EOL) is indexed by one each time a copy is made (Add 1 to EOL@CTR). On reaching a count of X (Is EOL@CTR More Than X?), counter 130 is reset to zero (Make EOL@CTR=0) and block counter 132 (SOL) indexed by one (Add 1 to SOL@CTR).

Referring now to FIG. 6, to implement indexing of cartridge counter 50, a check is first made to see if reed switch 60 (EOL) is activated (EOL Switch Active?). Counter solenoid 62 is then energized (Turn on Solenoid) for a brief period to increment ratchet wheel 74 and index cartridge counter 50 by one. Solenoid 62 is then deenergized (Turn off Solenoid). Switch 60 (EOL), which senses movement of magnet 55 to the raised position, is polled before, during, and after solenoid 62 is energized (EOL Switch Active?) to make sure that movement of magnet 55 takes place.

If magnet 55 is not raised when solenoid 62 is energized, a second attempt to index cartridge counter 50 by energizing solenoid 62 is made. If switch 60 (EOL) fails to activate on the second try (Is this 2nd try?), a fault is declared (Declare Fault) and machine 10 is inhibited from running until the problem is corrected.

If switch 60 (EOL) remains in the active position after solenoid 62 is turned off (EOL Switch Active?), this indicates that the number of warranted copies N has been used up and the cartridge is 'dead'. Referring again to FIG. 5, each time block counter 132 (SOL) is indexed, a check is made to see if the count on term counter 134 is equal to or less than the maximum block count Y' (reflecting the maximum number N' of grace copies) allowed (Is TERM@CTR≧Y'). If so, a check is made to see if a live cartridge is in the machine (Is There A Live Cartridge In Machine?), and if not, the machine is stopped (Stop Machine). Otherwise, term counter 134 is indexed by one.

With operation of machine 10 during the grace period, each time the count on copy counter 130 (EOL) reaches the count X where counter 130 is reset back to zero, block counter 132 (SOL) is indexed by one as described. However, since magnet 55 on the copy cartridge 12 is locked in the raised position by arm 84 as detected by switch 60 (EOL), solenoid 62 is not activated and no indexing of cartridge counter 50 takes place. Instead, term counter 134 is indexed by one at the end of the copy run while block counter (SOL) is decremented by one.

Term counter 134 counts up to a predetermined block count Y', representing the number of grace copies allowed. When the count on term counter 134 reaches the maximum block count Y' (Is TERM@CTR≧Y'?), indicating that the number N' of grace copies permitted have been exhausted, machine 10 is shut down until a fresh copy cartridge 12 is installed.

When the block count on term counter 134 is less than Y', any copy cartridge 12, dead or alive, can be used in machine 10. If a dead cartridge is in machine 10, the counter 50 will not be incremented but instead term counter 134 will be incremented each time copy counter (EOL) 130 is reset. In addition, while a dead copy cartridge is in the machine during the grace period, display 13 will flash to indicate to the operator that a new cartridge should be ordered.

Figure 7:
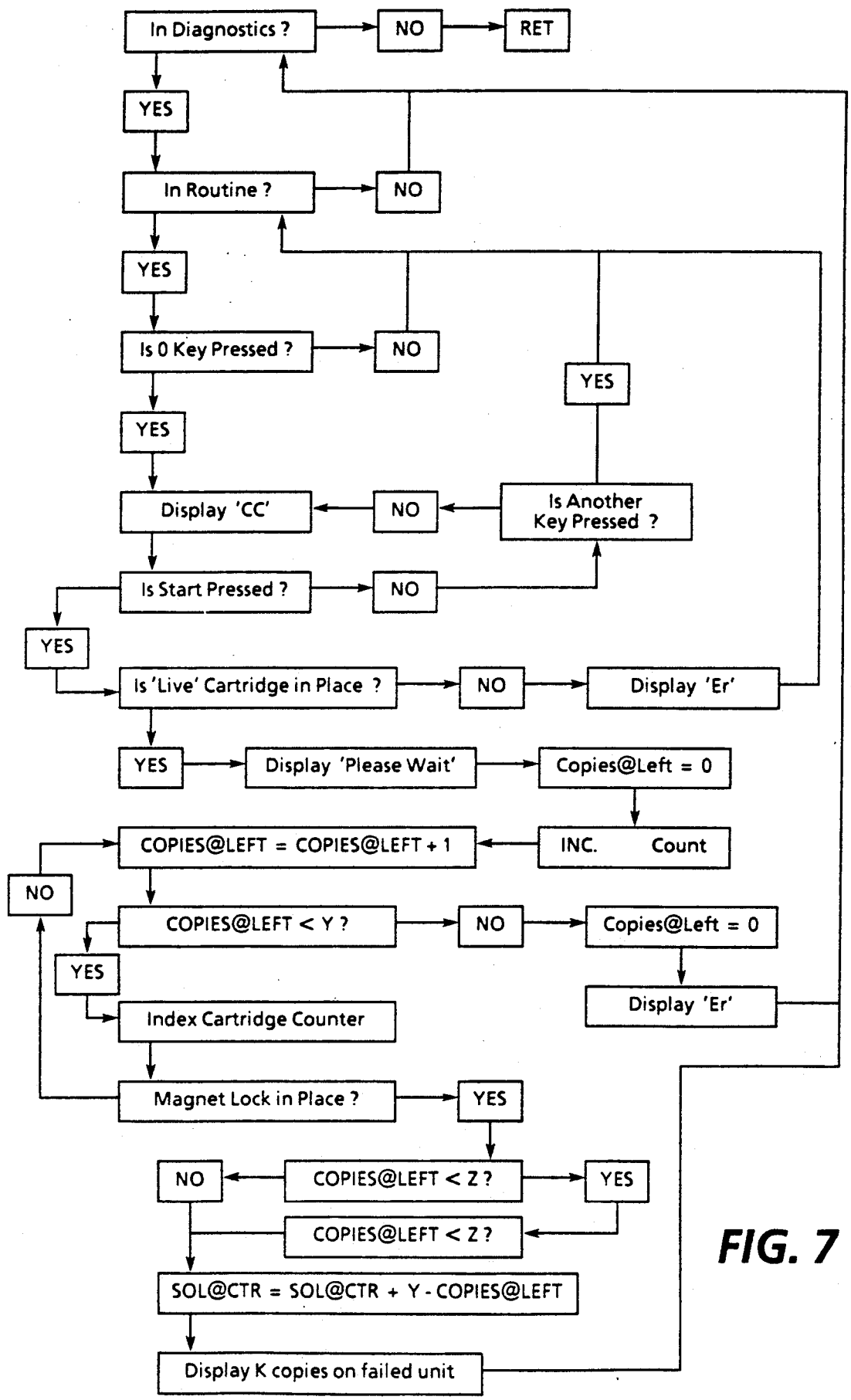
FIG. 7 is a flow chart depicting the operating cycle for replacing a prematurely failed cartridge with a fresh cartridge.

Referring particularly to FIG. 7, when a copy cartridge 12 fails prematurely before the number N of warranty copies is reached, the failed copy cartridge is replaced by a fresh copy cartridge. Since the number of warranty copies has not been reached at the time of failure, the fresh copy cartridge is set to a count equal to the number of warranty copies already made, in effect giving the user the same number of copies as orginally warranted. When replacing a failed copy cartridge, the Tech Rep enters a diagnostics mode (In Diagnostics?) in which controller 100 indexes counter 50 of the failed copy cartridge in the machine (Index Cartridge Counter) until magnet 62 is locked in the raised position (Magnet Lock in Place?). The operating system software then subtracts the number of indexes actually made from the maximum number Y of indexes available, and the result is added to block counter 132 (SOL@CTR=SOL@CTR+Y−COPIES@LEFT).

The result is also converted to the number of thousands of copies on the failed unit and displayed on the control panel in the copy countwindow (Display K copies on Failed unit).

At this point, the adjustment has been made in the software. On insertion of a new replacement copy cartridge, the count on cartridge counter 50 is adjusted at an accelerated rate until the setting of the count on the new cartridge equals that of the failed cartridge at the point of failure.

While the present invention has been disclosed as implemented by means of a replaceable copy cartridge, other replaceable cartridge types such as developer cartridge, toner cartridge, etc. may instead be envisioned for use in place of the aforedescribed copy cartridge or in combination therewith.

APPENDIX A

```
************************************
*
*       CRU-EOL-COUNTER
*
*       This routine decides whether or not to increment the
*       CRU hardware counter during the cycle down of the machine.
*       It also keeps track of the terminal counter durung the
*       last 2000 copies of a CRU's life.
*
*
*
************************************
*
CRU-EOL-COUNTER  EQU      $
        IF:      XBYTE.CRU@SOL@CTR,NE,#0
                 GETNVMBYTE        CRU@SOL@CTR
                 DEC      A
                 PUTNVMBYTE        CRU@SOL@CTR
                 ICALL    HDWR-CTR-INCREMENT
             IF: XBYTE,CRU@TERM@CTR,LT,#Y'
                 GETNVMBYTE        CRU@TERM@CTR
                 INC      A
                 PUTNVMBYTE        CRU@TERM@CTR
             ENDIF:
        ENDIF
        RET

************************************************************************
*
HDWR-CTR-INCREMENT       EQU      $
*       IF:      XBYTE,CRU@NVM@SWITCH,NE,#0
*                RET
*       ENDIF:
        IF:      RBIT,IN#BELT#EOL,SET             If sensor not activated
                 SETB     FLG@NOSTART
                 SET:     OUT$CRUCNT$SOL          Activate it and
                 START    CTR@CRU,TBL+CRU-TICKLE,0  Check to see that it works
*       ELSE:
*                SETB     FLG@NOSTART
*                SET:     OUT$CRUCNT$SOL          Or turn it on
*                START    CTR@CRU,TBL+CRU-CTROFF,0  And just turn it off
        ENDIF:
        RET
*
```

```
TBL-CRU-TICKLE     EQU      $

DB       20
        LJMP     EOL-TICKLE-CHECK

DB       25
        LJMP     CRU-SOL-OFF

DB       40
        STOP     CTR@CRU
        CLR      FLG@NOSTART
        IF:      RBIT,IN#BELT#EOL,CLEAR           If magnet stays in place
        ANDIF:   XBYTE,CRU@TERM@CTR,GT,#Y'        And terminal counter is non-active
                 CLR      A                       Make it active by
                 PUTNVMBYTE    CRU@TERM@CTR       Reset terminal count to 00
        ENDIF
        IF:      XBYTE,CRU@NVM@DATA,EQ,#0         If not already faulted
        ANDIF:   BIT,CRU@SENSOR@FLTFLG,SET        And first tickle not sensed
                 SETB     FLG@NOSTART
                 SET:     OUT$CRUCNT$SOL          Try it again to check for
                 START    CTR@CRU,TBL-CRU-TICKLE.0  Cheating of the sensor/switch
        ENDIF
        RET

*************************************************************************
*
*       EOL-TICKLE-CHECK
*
*       For checking if the CRU EOL magnet switch is working right!
*
*************************************************************************
*

EOL-TICKLE-CHECK     EQU      $
*
        IF:      RBIT,IN#BELT#EOL,SET             If sensor not activated
        ANDIF:   BIT,CRU@SENSOR@FLTFLG,CLEAR      And this is the first time
                 SETB     CRU@SENSOR@FLTFLG       Set the flag to indicate so
        ELSEIF:  RBIT,IN#BELT#EOL,SET
        ANDIF:   BIT,CRU@SENSOR@FLTFLG,SET        Else if it is the second time
                 CLR      CRU@SENSOR@FLTFLG       Stop the checking and
                 MOV      A,#1
                 PUTNVMBYTE    CRU@NVM@DATA       Set the FAULT
        ELSE:
                 CLR      CRU@SENSOR@FLTFLG       Everything worked
        ENDIF:
        RET

TBL-CRU-CTROFF      EQU      $

DB       5
        LJMP     CRU-SOL-OFF                      Turn off the counter solenoid

DB       10
        STOP     CTR@CRU
        CLR      FLG@NOSTART
        RET

*************************************************************************
*
*       TBL-FAULT-TICKLE
*
*       Timing table for tickle check of the CRU EOL switch
*
*
*************************************************************************
*
TBL-FAULT-TICKLE       EQU      $
*
        DB       20
        LJMP     CRU-SWITCH-RECOVERY
```

```
            DB      25
            LJMP    CRU+SOL+OFF                         Turn off the counter solenoid DB      40
            STOP    CTR@CRU                             Wait to allow fault checking
            CLR     FLG@NOSTART
            RET CRU+SOL+OFF EQU     $
            CLEAR   OUT$CRUCNT$SOL                      Turn off output
            RET KILL+CRU    EQU     $
            MOV     A,CRU@COPIES@LEFT                   Increment the counter keeping track of the
            INC     A                                   Number of clicks which were left on the CRU
            MOV     CRU@COPIES@LEFT,A
            IF:     BYTE,ACC,LT,#Y                      If number left doesn't
            SET:    OUT$CRUCNT$SOL                      Exceed number available
                    START   CTR@CRU,TBL+KILL+CRU,0      On a new CRU, increment it
            ELSE:
            CTR     A
            MOV     CRU@COPIES@LEFT,A                   Else
            MOV     A,#'4F'                             Load 'E' pattern into A
            MOV     B,#'05'                             Load 'r' pattern into B

TBL+KILL+CRU EQU    $

DB      20
            LJMP    EOL+TICKLE+CHECK

DB      25
            LJMP    CRU+SOL+OFF

DB      40
            STOP    CTR@CRU
            IF:     XBYTE,CRU@NVM@DATA,EQ,#0            If no tickle fault,
            IF:     RBIT,IN#BELT#EOL,SET                And not at end of life yet,
                    LCALL   KILL+CRU                    Increment counter again
            ELSE:
                    LCALL   FINISH+CRU+KILL             Else, it's all done.
            ENDIF:
            RET FINISH+CRU+KILL EQU $
            MOV     A,CRU@COPIES@LEFT                   Get the number of copies
            MOV     B,A                                 Left on warrantied CRU
            IF:     BYTE,ACC,LT,#Z
                    MOV     B,#Z                        Make it a minimum of 2760 copies
            ENDIF:
            MOV     A,#Y                                Determine how many copies
            CLR     C                                   The replacement CRU must
            SUBB    A,B                                 Be debited
            MOV     B,A
            GETNVMBYTE      CRU@SOL@CTR                 And add that number to
            CLR     C                                   The increments due
            ADD     A,B                                 to the CRU counter
            IF      BIT,CY,SET                          Making sure a roll over
                    MOV     A,#X'FF'                    Doesn't happen on that counter
            ENDIF:
            PUTNVMBYTE      CRU@SOL@CTR
            MOV     A,B                                 Determine (# of copies/1000) which
            MOV     B,#7                                Were on the warrantied CRU
            ADD     A,B
            MOV     B,#11                               And display that value on
            DIV     AB                                  The control panel
            CPWRITE NUM$DSP,ACC
            CPWRITE SEG$OFF,#(SEG$PLEAS$WAIT)           Turn off the PLEASE WAIT message
            CPWRITE SEG$ON,#(SEG$READY)                 Turn the READY LCD on.
            RET
```

We claim:

1. A customer billing system for an electrostatographic copying or printing machine, said machine having a movable photoreceptor, charging means for uniformly charging the photoreceptor, means for exposing the photoreceptor following charging to create electrostatic latent images on the photoreceptor, developing means for developing the electrostatic latent images on the photoreceptor, transfer means for transferring the developed images from the photoreceptor to a support material, fixing means to fix the transferred images on the support material and an operating system for controlling operation of said machine, comprising, in combination:

(a) at least one of said photoreceptor and developing means comprising a replaceable cartridge having a limited operational life allowing said machine on installation of said cartridge to produce a preset number of copies;

(b) said cartridge including a copy counter;

(c) counter operating means on said machine for indexing said cartridge copy counter as copies are produced by said machine; and (d) counter disabling means to disable said cartridge copy counter when said cartridge copy counter reaches a predetermined count representative of said preset number of copies.

2. The billing system according to claim 1 in which said operating system includes control means to prevent further operation of said machine following making of a second preset number of copies following disabling of said cartridge copy counter.

3. The billing system according to claim 1 in which said operating system includes copy counting means for counting copies made by said machine, said copy counting means actuating said counter operating means to index said cartridge copy counter in response to copies being made by said machine.

4. The billing system according to claim 3 in which said counter disabling means includes lockout means on said cartridge responsive to the count on said cartridge copy counter reaching said predetermined copy count to prevent indexing of said cartridge copy counter by said copy counting means.

5. The machine according to claim 1 in which said operating system includes means to enable said counter operating means to index said cartridge copy counter and advance the count on said cartridge copy counter without copies being made, said means permitting the count on said cartridge copy counter of a prematurely failed cartridge to be set to said predetermined count while permitting the cartridge copy counter of a replacement cartridge to be advanced to the copy count where said failed cartridge failed.

6. A customer billing system for an electrostatographic copying or printing machine, said machine having an operating system for controlling operation of said machine, comprising, in combination:

(a) a replaceable cartridge for use in operating said machine, said cartridge having a limited operational life allowing said machine on installation of said cartridge to produce a preset number of copies;

(b) said cartridge including a copy counter;

(c) counter operating means on said machine for indexing said cartridge copy counter as copies are produced by said machine; and (d) counter disabling means to disable said cartridge copy counter when said cartridge copy counter reaches a predetermined count representative of said preset number of copies;

said operating system including copy counting means for counting copies made by said machine;

said copy counting means actuating said counter operating means to index said cartridge copy counter in response to copies being made by said machine;

said counter disabling means including lockout means on said cartridge responsive to the count on said cartridge copy counter reaching said predetermined copy count to prevent indexing of said cartridge copy counter by said copy counting means;

said operating system further including warning means responsive to disabling of said cartridge copy counter to provide a visible indication that said cartridge is dead.

7. A customer billing system for an electrostatographic copying or printing machine, said machine having an operating system for controlling operation of said machine, comprising, in combination:

(a) a replaceable cartridge for use in operating said machine, said cartridge having a limited operational life allowing said machine on installation of said cartridge to produce a preset number of copies;

(b) said cartridge including a copy counter;

(c) counter operating means on said machine for indexing said cartridge copy counter as copies are produced by said machine;

(d) counter disabling means to disable said cartridge copy counter when said cartridge copy counter reaches a predetermined count representative of said preset number of copies;

said operating system including copy counting means for counting copies made by said machine;

said copy counting means actuating said counter operating means to index said cartridge copy counter in response to copies being made by said machine;

said counter disabling means including lockout means on said cartridge responsive to the count on said cartridge copy counter reaching said predetermined copy count to prevent indexing of said cartridge copy counter by said copy counting means;

said operating system further including second copy counting means for counting copies made by said machine, said second copy counting means being enabled in response to disabling of said cartridge copy counter to count the number of copies made by said machine after said cartridge copy counter is disabled; and control means for stopping said machine when said second copy counting means reaches a predetermined count.

8. A customer billing system for an electrostatographic copying or printing machine, said machine having an operating system for controlling operation of said machine, comprising, in combination:

(a) a replaceable cartridge for use in operating said machine, said cartridge having a limited operational life allowing said machine on installation of said cartridge to produce a predetermined number of copies;

(b) said cartridge including a copy counter;

(c) counter operating means on said machine for indexing said cartridge copy counter as copies are produced by said machine; and (d) counter disabling means to disable said cartridge copy counter and render said cartidge dead when said cartridge copy counter reaches a preset copy count;

(e) said operating system including grace means to allow said machine to produce a predetermined number of grace copies using a dead cartridge pending installation of a fresh cartridge.

9. The billing system according to claim 8 in which said grace means includes stop means for stopping said machine and rendering said machine inoperative until said fresh cartridge is installed following making of said predetermined number of grace copies.

10. The billing system according to claim 9 in which said operating system includes a second copy counter for counting said grace copies, said second copy counter being enabled in response to disabling of said cartridge copy counter, said second copy counter on reaching a preset count representative of said predetermined number of grace copies actuating said stop means to render said machine inoperative.

11. A billing and warranty method for copier/printing machines employing a replaceable subassembly, comprising the steps of:

(a) warranting a preset number of copies with said subassembly;

(b) as said copies are produced, tolling a copy count on said subassembly;

(c) when said copy count reaches a predetermined maximum copy count reflecting said preset number of copies, precluding further operation of said machine until a new subassembly is installed;

d where said subassembly fails before said preset number of copies are produced, manually advancing the copy count on said subassembly to said predetermined maximum copy count;

e removing said subassembly and installing a new subassembly; and f manually advancing the copy count on said new subassembly until the copy count on said new subassembly is the same as the copy count on said removed subassembly at the time said subassembly failed.

12. A billing and warranty method for a copier/printing machine using a replaceable subassembly guaranteed to provide a preset number of copies, comprising the steps of:

(a) tolling a count of copies made on at least one counter in said machine and on a counter in said cartridge;

(b) when the copy count on said cartridge counter reaches a predetermined copy count, preventing further counting by said cartridge counter;

(c) continuing tolling a count of subsequent copies on said machine counter; and (d) when the copy count on said machine counter reaches a predetermined copy count reflecting said guaranteed number of copies, shutting down said machine until a new cartridge is installed.

13. The method according to claim 12 including the steps of:

(a) indexing said cartridge counter in response to counts on said machine counter;

(b) providing a second counter in said machine;

(c) when the count on said cartridge counter reaches said predetermined copy count and said cartridge counter is disabled, continuing said copy count on said second counter.

14. The method according to claim 13 including the steps of:

(a) generating a proof signal each time said cartridge counter is indexed; and (b) when said cartridge counter reaches said predetermined copy count and is disabled, starting said second machine counter in response to said signal.

15. A billing and warranty method for copier/printing machines, comprising the steps of:

(a) tolling a copy count in both said machine and in said cartridge;

(b) when said copy count in said cartridge reaches a preset maximum copy count, stopping further counting by said cartridge counter;

(c) continuing tolling the copy count in said machine until a preset number of grace copies are made; and (d) stopping said machine when said preset number of grace copies is equaled.

* * * * *